(12) United States Patent
Coustry et al.

(10) Patent No.: US 8,202,659 B2
(45) Date of Patent: Jun. 19, 2012

(54) METHOD FOR OBTAINING SODIUM CARBONATE MONOHYDRATE CRYSTALS

(75) Inventors: Francis Coustry, Alsemberg (BE); Michel Hanse, Nivelles (BE)

(73) Assignee: Solvay (Societe Anonyme), Brussels (BE)

( * ) Notice: Subject to any disclaimer, the term of this patent is extended or adjusted under 35 U.S.C. 154(b) by 311 days.

(21) Appl. No.: 12/712,386

(22) Filed: Feb. 25, 2010

(65) Prior Publication Data

US 2010/0147698 A1     Jun. 17, 2010

Related U.S. Application Data

(63) Continuation of application No. 11/817,736, filed as application No. PCT/EP2006/060524 on Mar. 7, 2006, now Pat. No. 7,708,972.

(30) Foreign Application Priority Data

Mar. 8, 2005  (FR) ...................... 05 02371

(51) Int. Cl.
- *C01D 7/00* (2006.01)
- *C01D 15/08* (2006.01)
- *C01D 17/00* (2006.01)
- *C01D 7/14* (2006.01)
- *C01D 1/32* (2006.01)

(52) U.S. Cl. ........ 429/421; 423/189; 423/190; 205/407; 205/408; 205/464; 205/556

(58) Field of Classification Search ............... 423/189, 423/190, 421; 205/407, 408, 464, 556
See application file for complete search history.

(56) References Cited

U.S. PATENT DOCUMENTS

| | | |
|---|---|---|
| 2,383,674 A | 8/1945 | Osborne |
| 3,644,089 A | 2/1972 | Minz et al. |
| 3,751,560 A | 8/1973 | Neumann |
| 3,843,768 A | 10/1974 | Neumann |
| 3,855,397 A | 12/1974 | Hoffman et al. |
| 4,219,396 A | 8/1980 | Gancy et al. |
| 4,260,594 A | 4/1981 | Verlaeten et al. |

FOREIGN PATENT DOCUMENTS

| | | |
|---|---|---|
| BE | 829 323 | 11/1975 |
| BE | 861 527 | 6/1978 |
| GB | 895 690 | 5/1962 |
| GB | 1 143 844 | 2/1969 |
| GB | 1 538 829 | 1/1979 |
| JP | 4620143 | 6/1971 |

*Primary Examiner* — Jerry Lorengo
*Assistant Examiner* — Carlos Barcena
(74) *Attorney, Agent, or Firm* — Oblon, Spivak, McClelland, Maier & Neustadt, L.L.P.

(57) ABSTRACT

A method for producing sodium carbonate monohydrate, according to which an aqueous sodium chloride solution (5) is electrolyzed in a membrane-type cell (1) from which an aqueous sodium hydroxide solution (9) is collected, and carbonated by direct contact with carbon dioxide (15) to form a slurry of crystals of a sodium carbonate monohydrate (16), and the slurry or its mother liquor is evaporated (3) to collect sodium carbonate monohydrate (18).

16 Claims, 2 Drawing Sheets

METHOD FOR OBTAINING SODIUM CARBONATE MONOHYDRATE CRYSTALS

REFERENCE TO PRIOR APPLICATIONS

This application is a Continuation of U.S. application Ser. No. 11/817,736, filed Mar. 12, 2008, now allowed; and is a 371 application of PCT/EP2006/060524, filed Mar. 7, 2006, and claims priority to French patent application 05 02371, filed Mar. 8, 2005, all incorporated herein by reference.

FIELD OF THE INVENTION

The invention relates to a method for obtaining sodium carbonate crystals. More particularly, it relates to a method for obtaining sodium carbonate crystals from a sodium hydroxide solution obtained by electrolysis.

BACKGROUND OF THE INVENTION

Alkali metal carbonates and sodium carbonate in particular are very widespread industrial products with many applications. In the glass industry, sodium carbonate is an essential ingredient for easier processing of the glass.

The detergent, textiles, pulp and paper industries are also examples of industries consuming a large quantity of sodium carbonate.

Due to this extremely high consumption, methods for producing sodium carbonate are of great economic and environmental importance.

Sodium carbonate can be obtained by purifying natural sodium carbonate extracted from trona deposits or by synthesis. Most synthetic sodium carbonate is currently produced by the "SOLVAY" process also called the ammonia process. In this process, ammonia is absorbed by a sodium chloride solution. The ammoniacal brine thus formed is contacted with carbon dioxide to produce bicarbonate, which is separated from the mother liquor and then calcined. The ammonia present in the mother liquor and the carbon dioxide liberated during calcination are recovered and recycled.

However, this process requires extremely high investments.

In patent BE861527 of the applicant, another method is described, in which an aqueous sodium chloride solution is electrolyzed in a cell with a membrane selectively permeable to the ions in order to produce chlorine and an aqueous sodium hydroxide solution which is carbonated and then evaporated to produce sodium carbonate crystals. In this method, the carbonation is carried out by mixing the sodium hydroxide with a bicarbonated solution in the electrolyzer. However, an efficient carbonation by liquid mixing has proved difficult to achieve.

DETAILED DESCRIPTION OF THE INVENTION

It is the object of the invention to provide a simplified method, easy to implement and suitable for the economical production of crystals of sodium carbonate monohydrate.

In consequence, the invention relates to a method for producing sodium carbonate, according to which an aqueous sodium chloride solution is electrolyzed in a cell with a membrane selectively permeable to ions in order to produce chlorine and an aqueous solution comprising sodium hydroxide, the aqueous solution comprising sodium hydroxide is carbonated, the resulting carbonated aqueous solution is evaporated in order to produce sodium carbonate crystals, which are separated, and a mother liquor. According to the invention, the carbonation is carried out by directly contacting carbon dioxide with the aqueous solution comprising sodium hydroxide under conditions such as to cause the conversion of the aqueous solution into an aqueous slurry of sodium carbonate crystals.

In the method according the invention, the cell with an ion permselective membrane is an electrolytic cell comprising at least one anode chamber and at least one cathode chamber separated by at least one membrane substantially impermeable to liquids (mainly aqueous solutions), but selectively permeable to ions. Membrane-type electrolytic cells are well known in the prior art and commonly used for producing aqueous sodium hydroxide solutions by the electrolysis of aqueous sodium chloride solutions.

In the method according to the invention, it is preferable for the membrane of the cell to be cation permselective. By definition, when a membrane is contacted with an electrolyte between an anode and a cathode, it is crossed by cations of the electrolyte but is substantially impermeable to the transfer of anions.

In this preferred embodiment of the invention, the aqueous sodium chloride solution is introduced into the anode chamber of the cell and the aqueous sodium hydroxide solution is generated in the cathode chamber of the cell. Simultaneously, chlorine is produced in the anode chamber and hydrogen is produced in the cathode chamber.

According to a first feature of the invention, the aqueous sodium hydroxide solution is drawn off outside the cell, before carbonation, and is carbonated in a reactor located outside the cell.

According to a second feature of the invention, the carbonation of the aqueous sodium hydroxide solution is carried out by direct contact of the said solution with a gas containing carbon dioxide, under conditions regulated to crystallize a sodium carbonate. Data concerning the gas containing the carbon dioxide are given below.

In the present invention, the expression "sodium carbonate" has a very broad definition that includes anhydrous sodium carbonate and hydrated sodium carbonates. The acid carbonate or sodium bicarbonate ($NaHCO_3$) is excluded from the definition of the invention.

The method according to the invention has the particular feature of a reaction in the presence of three distinct phases: a liquid phase, a gas phase and a crystalline solid phase. Accordingly, a reactor adapted to the coexistence of these three phases is advantageously used for the treatment of the aqueous sodium hydroxide solution with the gas containing carbon dioxide.

In a particular embodiment of the invention, it is specially recommended to circulate the aqueous sodium hydroxide solution in countercurrent to the gas containing carbon dioxide, in a reactor comprising a tower consisting of the stack of at least two superimposed segments, separated by a partition perforated with at least two openings, the segments comprising at least one transverse wall for causing convection of the suspension in the said segment. Such a reactor facilitates and accelerates the reaction of the gas with the liquid and, in consequence, the crystallization of the sodium carbonate.

In a preferred embodiment of the method according to the invention, the aqueous solution containing sodium hydroxide is essentially free of carbonate and/or bicarbonate ions when directly contacted with the carbon dioxide. In this embodiment of the invention, subjecting the said aqueous solution to a carbonation or a partial bicarbonation before contacting it directly with the carbon dioxide is therefore explicitly avoided.

In the method according to the invention, the slurry collected from the carbonation or its mother liquor is subjected to evaporation. The evaporation has the function of causing additional crystallization of sodium carbonate. It is normally effected in an evaporator-crystallizer. This unit is not critical for the definition of the invention. A multistage evaporator or a mechanical vapour recompression evaporator is advantageously used.

In a first embodiment of the invention, the slurry is subjected to evaporation as such.

In a second embodiment of the invention, the slurry is first subjected to a mechanical separation of the crystals that it contains and the resulting mother liquor (aqueous sodium carbonate solution) is then subjected to evaporation.

The separation of the crystals from the slurry, before and/or after the evaporation can be carried out by any appropriate mechanical separating means, for example by settling, by spin drying, by filtration or by a combination of these three separating means.

The mother liquor collected from the mechanical separation that follows the evaporation essentially consists of an aqueous sodium carbonate solution. It may advantageously be used to purify the abovementioned aqueous sodium chloride solution, to be fed to the membrane type electrolytic cell.

In an advantageous embodiment of the invention, the electrolysis in the membrane-type cell is regulated so that the aqueous sodium hydroxide solution contains 25 to 40 (preferably 30 to 35)% by weight of sodium hydroxide, and the carbonation conditions are regulated so that the slurry comprises crystals of sodium carbonate monohydrate ($Na_2CO_3.H_2O$). It is preferable for the sodium carbonate crystals of the slurry to essentially consist of crystals of sodium carbonate monohydrate. In this embodiment, the aqueous sodium hydroxide solution is normally carbonated at a temperature above 35° C. and lower than 107.5° C. at standard atmospheric pressure. Temperatures above 50 (preferably above 70)° C. and lower that 100 (preferably 90)° C. are advantageously used. Temperatures from 75 to 85° C. are specially preferred.

In a preferred variant of execution of the embodiment just described, the operating conditions are also regulated in the evaporator-crystallizer so that the sodium carbonate from additional crystallization essentially consists of crystals of sodium carbonate monohydrate.

In the advantageous embodiment described above and its preferred variant of execution, the crystallization of sodium carbonate monohydrate is an advantage for the subsequent production of concentrated caustic soda.

In the method according to the invention, the gas containing carbon dioxide may be a rich gas or a lean gas.

In a preferred embodiment of the invention, the rich gas is obtained by attacking limestone with an aqueous hydrochloride acid solution, which is obtained by dispersing, in water, hydrogen chloride that is obtained by reacting chlorine and hydrogen produced in the membrane-type cell.

In another embodiment of the invention, using lean gas, this comprises a flue gas issuing from a thermal installation for cogeneration of heat and power, for example, a steam gas turbine.

The cogeneration installation advantageously at least partly supplies a proximate chlorine derivative production unit which generates carbon dioxide used by the sodium carbonate production unit with electricity and/or steam. It also advantageously supplies the electrolyzer with electricity and the evaporator with steam.

In the method according to the invention, a dilute brine of sodium chloride is collected from the membrane-type cell. This brine may be discharged or used in another production unit.

In a preferred embodiment of the invention, the dilute brine collected from the membrane-type cell is recycled in the anode chamber of the cell, after having been purified and concentrated with sodium chloride. Purification commonly and conventionally comprises, in a known way, a dechlorination, a dechloratation and a desulphation. To concentrate the dilute brine, solid sodium chloride, for example rock salt, can be added to it. It is preferable to circulate it through a rock salt deposit.

If rock salt is used to concentrate the dilute brine in the electrolytic cell, the concentrated brine must be stripped, particularly of calcium ions, magnesium ions and sulphate ions. To strip the concentrated brine of calcium ions, it can advantageously be treated with a fraction of the mother liquor from the sodium carbonate crystallization. To strip it of magnesium ions, it can be treated with a fraction of the aqueous sodium hydroxide solution produced in the electrolytic cell.

The method according to the invention is suitable for easily and economically producing high purity sodium carbonate, particularly optimum-grade concentrated caustic soda, without requiring a costly industrial investment.

BRIEF DESCRIPTION OF THE DRAWINGS

Particular features and details of the invention will appear from the description below of the drawings appended hereto.

In these figures, similar reference numerals denote the same elements.

Figure 1:
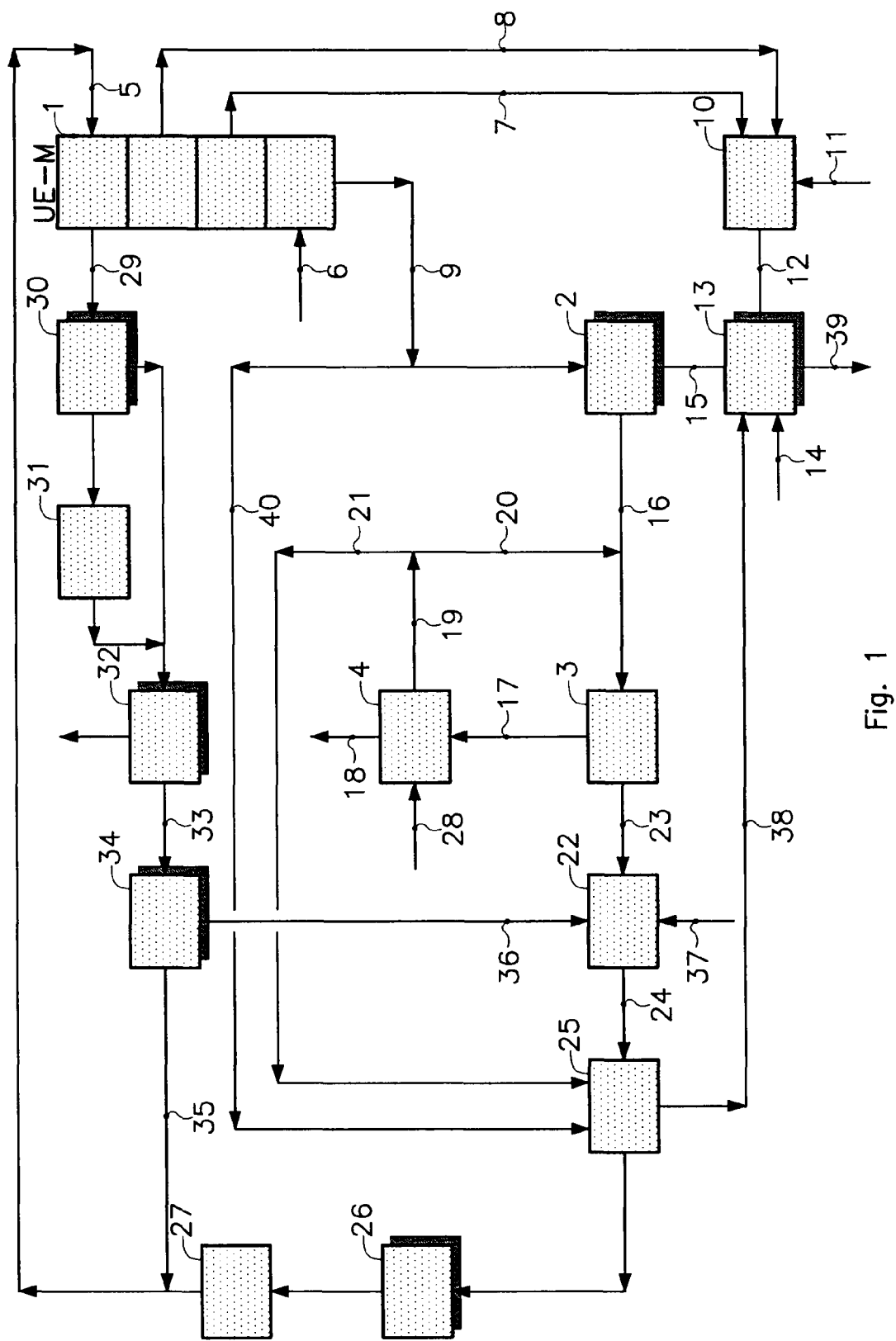
FIG. 1 schematically shows an installation for implementing a first embodiment of the method according to the invention.

The installation shown schematically in FIG. 1 comprises an electrolytic cell 1, a carbonation tower 2, an evaporator-crystallizer 3 and a spin drying chamber 4.

The electrolytic cell 1 is of the type with cation permselective membranes. It comprises anode chambers and cathode chambers which are separated from the anode chambers by cation permselective membranes. The cell may be of the single-pole or two-pole type.

Cells with cation permselective membranes are well known in electrolytic technique and widely used for the industrial production of aqueous sodium hydroxide solutions from brines or aqueous sodium chloride solutions.

According to the invention, an aqueous solution 5 substantially saturated with sodium chloride is introduced into the anode chambers of the electrolytic cell 1, and water 6 is introduced into the cathode chambers of the cell. During electrolysis, chlorine 7 is generated in the anode chambers of the cell and extracted therefrom. Simultaneously, hydrogen 8 and an aqueous sodium hydroxide solution 9 are produced in the cathode chambers and extracted therefrom.

The chlorine 7 and the hydrogen 8 are sent to a reaction chamber 10 that is also supplied with a defined flow rate of water 11. An aqueous hydrochloric acid solution 12 is extracted from the chamber 10 and sent to a reactor 13, supplied with crushed limestone 14. In the reactor 13, the limestone is attacked and decomposed by the hydrochloric acid to produce a gas 15 containing carbon dioxide and a waste aqueous solution of calcium chloride 39.

The aqueous sodium hydroxide solution 9 and the gas containing the carbon dioxide 15 are sent to the carbonation tower 2, where they are circulated in countercurrent and in contact with each other. To intensify the contact of the gas with the aqueous solution and, consequently, the yield of the reaction between the gas and the solution, the column consists of the stack of several segments, separated by substantially horizontal or slightly inclined partitions. Each partition is perforated with an opening near its periphery, for the downflow of the solution, and with one or a plurality of openings in its central zone, for the upflow of the gas. The segments are further compartmentalized by vertical partitions forming baffles for the circulation of the solution. Columns that may be suitable for the invention are also described in document BE-829 323.

A temperature of about 80° C. is produced in the carbonation tower 2 in order to crystallize sodium carbonate monohydrate.

An aqueous slurry of sodium carbonate monohydrate crystals 16 is collected in the carbonation tower 2, and immediately sent to the evaporator-crystallizer 3. In this unit, the slurry is subjected to controlled evaporation to crystallize sodium carbonate. Evaporation is normally effected at low pressure, at a temperature corresponding to the crystallization of the sodium carbonate in monohydrate form. The slurry 17 collected from the evaporator-crystallizer 3 is sent to the spin drying chamber 4 where the crystals of sodium carbonate monohydrate 18 and a mother liquor 19 are separated. In the spin drying chamber 4, the crystals of sodium carbonate monohydrate are also subjected to washing with a controlled stream of water.

The crystals of sodium carbonate monohydrate 18 are sent to an installation for producing concentrated caustic soda, not shown.

The mother liquor 19 from the crystallization of the monohydrate is split into two fractions 20 and 21. The fraction 20 is recycled in the evaporator-crystallizer 3. The destination of the fraction 21 will be explained below.

In the evaporator-crystallizer 3, steam 23 is also produced, condensed and sent to a rock salt deposit 22, where a saturated brine of sodium chloride 24 is collected. This is sent to a reactor 25, where the calcium and magnesium ions are stripped off with the fraction 21 of the mother liquor and with the fraction 40 of the aqueous sodium hydroxide solution produced in the electrolytic cell 1. The brine collected from the reactor 25 is then filtered (26) and purified (27), and then sent to the anode chambers of the electrolytic cell 1. Sludges 38 containing calcium carbonate are also collected from the reactor 25, and sent to the reactor 13.

The dilute brine 29 collected from the anode chambers of the electrolytic cell 1 is sent to a succession of reaction chambers 30, 31, 32, where it is successively subjected to dechloratation, dechlorination and desulphatation treatments. The dilute and purified brine 33 is then treated in a mechanical vapour recompression installation 34 to saturate it with sodium chloride. A substantially saturated brine 35 is collected from the apparatus 34, on the one hand, and sent to the anode chambers of the electrolytic cell 1, and, on the other, steam 36, which is condensed and sent to the rock salt deposit 22, with make-up water 37.

Figure 2:
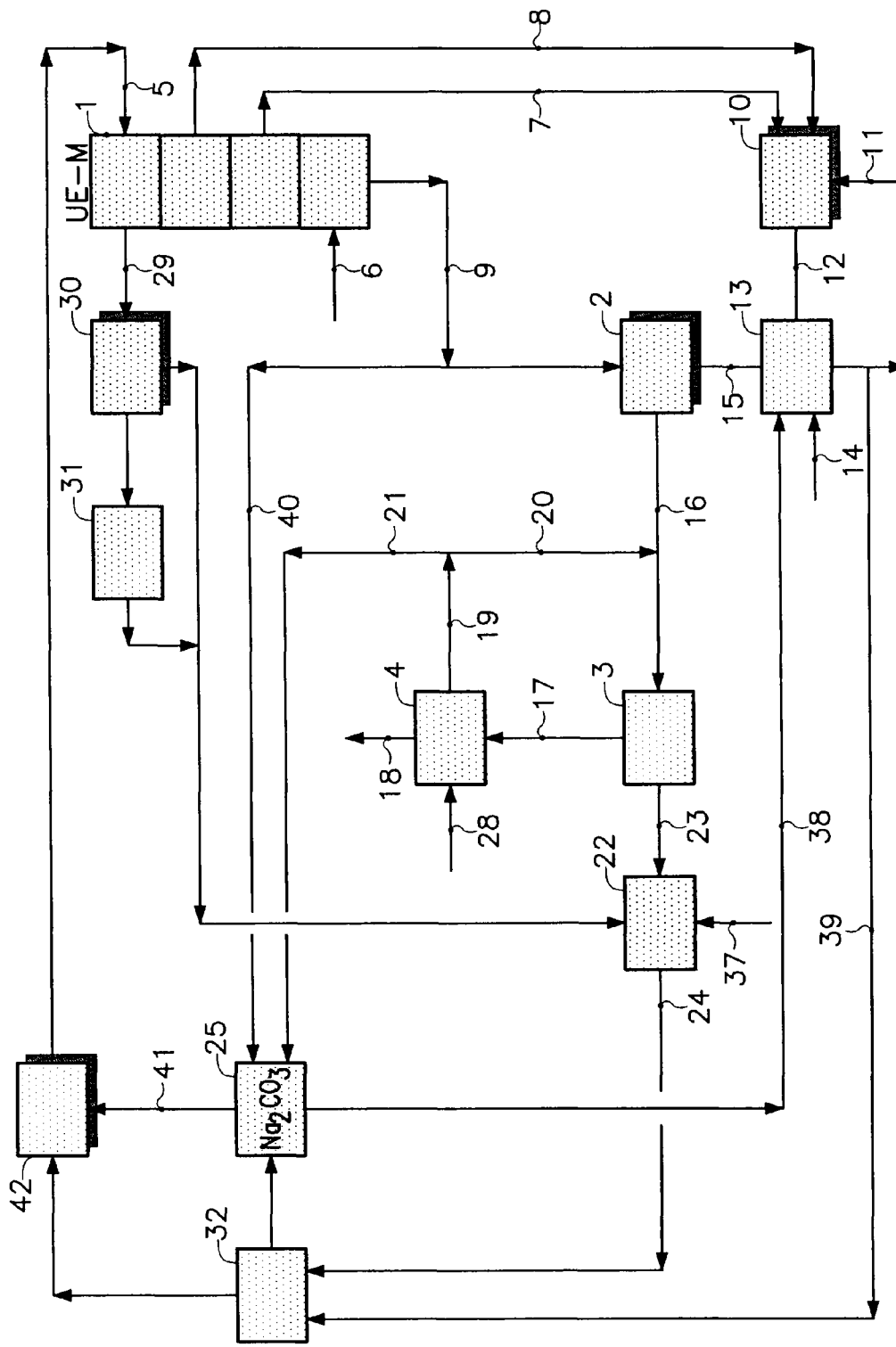
FIG. 2 schematically shows another installation for the implementation of another embodiment of the method according to the invention.

The method implemented in the installation in FIG. 2 differs from the one in FIG. 1 in the treatment of the dilute brine 29 collected from the anode chambers of the electrolytic cell 1. After dechloratation and dechlorination in the reaction chambers 30 and 31, the dilute brine 29 is sent to the rock salt deposit 22, where it joins the condensed vapour 23 from the evaporator-crystallizer 3 and the make-up water 37. The saturated brine 24 collected from the rock salt deposit 22 is subjected to a purification treatment comprising a desulphatation in a reactor 32 and stripping of calcium and magnesium in a reactor 25. The desulphatation in the reactor 32 is carried out using the aqueous waste calcium chloride solution 39 from the reactor 13. The calcium and magnesium ions are stripped in the reactor 25 as described above, with reference to FIG. 1. The saturated and purified brine 41 is then filtered (42), to reconstitute the brine 5 that is introduced into the anode chambers of the electrolytic cell 1.

The example below serves to illustrate the invention. It refers to FIG. 1.

1,134.6 t/h of a substantially saturated brine (5), containing, per kg, 253 g of sodium chloride, 7.0 g of sodium sulphate and 740 g of water, are introduced into the anode chamber of the membrane-type cell (1). The following are drawn off from the cell (1):

- 830.1 t/h of depleted or dilute brine (29), containing, per kg, 185 g of sodium chloride, 9.6 g of sodium sulphate and 806 g of water;
- 285.8 t/h of an aqueous sodium hydroxide solution (9) containing, per kg, 320 g of sodium hydroxide and 680 g of water; and
- 83.5 t/h of hydrogen chloride, obtained by mixing the chlorine (7) and the hydrogen (8) produced in the cell.

A fraction (40) of the sodium hydroxide solution (9), equal to 4.3 t/h, is sent to the purification reactor (25). The remainder of the aqueous sodium hydroxide solution is sent to the carbonation tower (2). Thus 281.6 t/h of solution are sent to the carbonation tower (2), containing, per kg, 320 g of sodium hydroxide and 680 g of water.

49.6 t/h of carbon dioxide (15) are introduced into the carbonation tower (2), from which 48.7 t/h of water and 282.4 t/h of an aqueous slurry (16) containing 493.2 g of sodium carbonate monohydrate per kg, are withdrawn.

The slurry (16) is introduced into the evaporator-crystallizer (3) in a mixture with 262 t/h of mother liquor (20), containing, per kg, 281.9 g of dissolved sodium carbonate and 669 g of water. 162 t/h of water (23) and 382.3 t/h of slurry (17) containing 591.8 g of sodium carbonate monohydrate per kg, are extracted from the evaporator-crystallizer (3). In the spin drying chamber (4), the slurry (17) is introduced with 28.5 t/h of water (28) serving to wash the crystals of sodium carbonate monohydrate. 142.6 t of crystals of sodium carbonate monohydrate and 268 t/h of dilute mother liquor (19) are collected from the spin drying chamber (4). After separation of the 262 t/h (20) recycled in the evaporator-crystallizer (3), the remainder of the dilute mother liquor (21) (6.2 t/h) is sent to the purification reactor (25).

The dilute brine (29) (830.1 t/h) extracted from the electrolytic cell (1) is treated in the purification installation (30, 31, 32), from which 772.7 t/h of dilute and purified brine (33) are extracted. This is sent to the mechanical vapour recompression installation (34), from which 577.6 t/h of saturated brine (35) and 195.1 t/h of water are collected and sent to the salt deposit (22). The saturated brine (35) contains 250 g of sodium chloride per kg. It is sent to the anode chamber of cell (1) with 557.0 t/h of saturated brine issuing from the brine purification reactors (25, 26, 27).

To produce the carbon dioxide used in the carbonation tower (2), the abovementioned hydrogen chloride (83.5 t/h) is dispersed in 185.8 t/h of water and the hydrochloric acid (12) thus produced is introduced into the reactor (13) with 111.6 t/h of limestone (14) and 19.1 t/h of sludge (38), issuing from the purification of the brine.

The invention claimed is:

1. A method for producing sodium carbonate monohydrate, comprising:
electrolyzing an aqueous sodium chloride solution comprising 25 to 40% by weight of sodium hydroxide in a cell with an ion permselective membrane in order to produce chlorine and an aqueous solution comprising sodium hydroxide, and
carbonating the aqueous solution comprising sodium hydroxide wherein the carbonation is carried out by directly contacting carbon dioxide with the aqueous solution comprising sodium hydroxide under conditions that cause the initial conversion of the aqueous solution into an aqueous slurry comprising sodium carbonate monohydrate crystals without evaporation.

2. The method according to claim 1, wherein the direct contacting of the carbon dioxide with the aqueous sodium hydroxide solution is carried out by circulating the solution in countercurrent to a gas containing the carbon dioxide in a tower comprising a stack of at least two superimposed segments separated by a partition perforated with at least two openings, the segments comprising at least one transverse wall for causing convection of the suspension in the segment.

3. The method according to claim 1, wherein the ion permselective membrane is a cation permselective membrane.

4. The method according to claim 1, in which a chlorine derivative is produced from the chlorine and in which the carbonation is effected at least partly using carbon dioxide produced in the production of the chlorine derivative.

5. The method according to claim 1, further comprising subsequently evaporating the slurry in an evaporator-crystallizer.

6. The method according to claim 5, wherein the evaporator-crystallizer comprises a multistage evaporator or a mechanical vapour recompression evaporator.

7. The method according to claim 1, wherein the electrolysis is regulated so that the aqueous sodium hydroxide solution comprises about 32% by weight of sodium hydroxide and the carbonation operating conditions are regulated so that the sodium carbonate in the slurry is sodium carbonate monohydrate.

8. The method according to claim 5, wherein the operating conditions in the evaporator-crystallizer are regulated so that the sodium carbonate crystals resulting from the evaporation of the slurry are crystals of sodium carbonate monohydrate.

9. The method according to claim 1, wherein at least part of the carbon dioxide used in carbonating is obtained by attacking limestone with an aqueous hydrochloric acid solution obtained by dispersing, in water hydrogen chloride obtained by reacting chlorine with hydrogen produced in the cell with an ion permselective membrane.

10. The method according to claim 1, wherein at least part of the carbon dioxide used in carbonating is a flue gas from a thermal installation for cogeneration of heat and power.

11. The method according to claim 1, wherein a dilute brine is collected from the cell with an ion permselective membrane and recycled in the anode chamber of the cell, after having purified and concentrated it with sodium chloride.

12. The method according to claim 11, wherein the dilute brine is concentrated by circulating it in a rock salt deposit.

13. The method according to claim 1, further comprising evaporating the aqueous slurry of sodium carbonate crystals.

14. The method according to claim 1, further comprising the separation of the aqueous slurry of sodium carbonate crystals into sodium carbonate crystals and a mother liquor.

15. The method according to claim 14, further comprising, after separation, evaporating the mother liquor.

16. The method according to claim 1, wherein the aqueous sodium chloride solution comprises 30 to 35% by weight of sodium hydroxide.

* * * * *